May 31, 1966   P. FAHLENBERG   3,253,529
CAMERA SHUTTER MECHANISM
Filed March 7, 1963   4 Sheets-Sheet 3

May 31, 1966 P. FAHLENBERG 3,253,529
CAMERA SHUTTER MECHANISM

Filed March 7, 1963 4 Sheets-Sheet 4

United States Patent Office 3,253,529
Patented May 31, 1966

3,253,529
CAMERA SHUTTER MECHANISM
Paul Fahlenberg, Baierbrunn, Germany, assignor to Compur-Werk Gesellschaft mit beschränkter Haftung & Co., Munich, Germany, a company of Germany
Filed Mar. 7, 1963, Ser. No. 263,504
Claims priority, application Germany, Mar. 14, 1962, C 26,486
8 Claims. (Cl. 95—53)

The present invention relates to a system for controlling the operation of a camera shutter and more particularly to a simplified electrical system wherein there are provided a plurality of electrical circuit each of which actuates the shutter according to a predetermined sequence with a single control switch providing means for selectively energizing these circuits. The present invention further provides means for automatically cocking the shutter.

Most cameras are provided with means for varying the mode of operation of the shutter. For example, self portraits require considerable delay between the time of actuation of the means to trip the shutter and the opening of the shutter. A short delay between the time of actuation of the means to trip the shutter and the opening of the shutter is required for flashbulb photographs using flash. Time exposures require still another type of operation of the shutter. Both mechanical and electrical systems have been provided for effecting these various modes of operation of the shutter. Known mechanical systems utilize two rings rotatable about the optical axis and known electrical systems require a plurality of transistors in order to achieve the desired result.

The present invention provides a simplified system which eliminates the need for expensive electrical and mechanical parts. A plurality of RC circuits are provided, each of which actuates the shutter according to a predetermined sequence. RC current in this case is an electrical circuit connecting an electrical source and a load, e.g., a four-layer diode and a coil, through an RC member (resistor and condenser) for purposes of delaying. A single control switch is provided whereby the desired shutter operation may be manually preselected. Thus, by one simple control switch the proper circuit is energized and the predetermined shutter operation occurs. There is provided an electrical circuit for automatically cocking the shutter as soon as it has run down.

A primary object of the present invention is to provide a simplified electrical circuit for actuating a camera shutter in a plurality of different modes of operation.

Another object of the present invention is to provide a camera with a single control switch for energizing one of a plurality of RC circuits which control the operation of the shutter.

Still another object of the present invention is to provide a means for automatically cocking the shutter after it has run down.

Other objects and many of the attendant advantages of the present invention will become more readily apparent upon consideration of the following detailed specification in connection with the accompanying drawings wherein.

Figure 1:
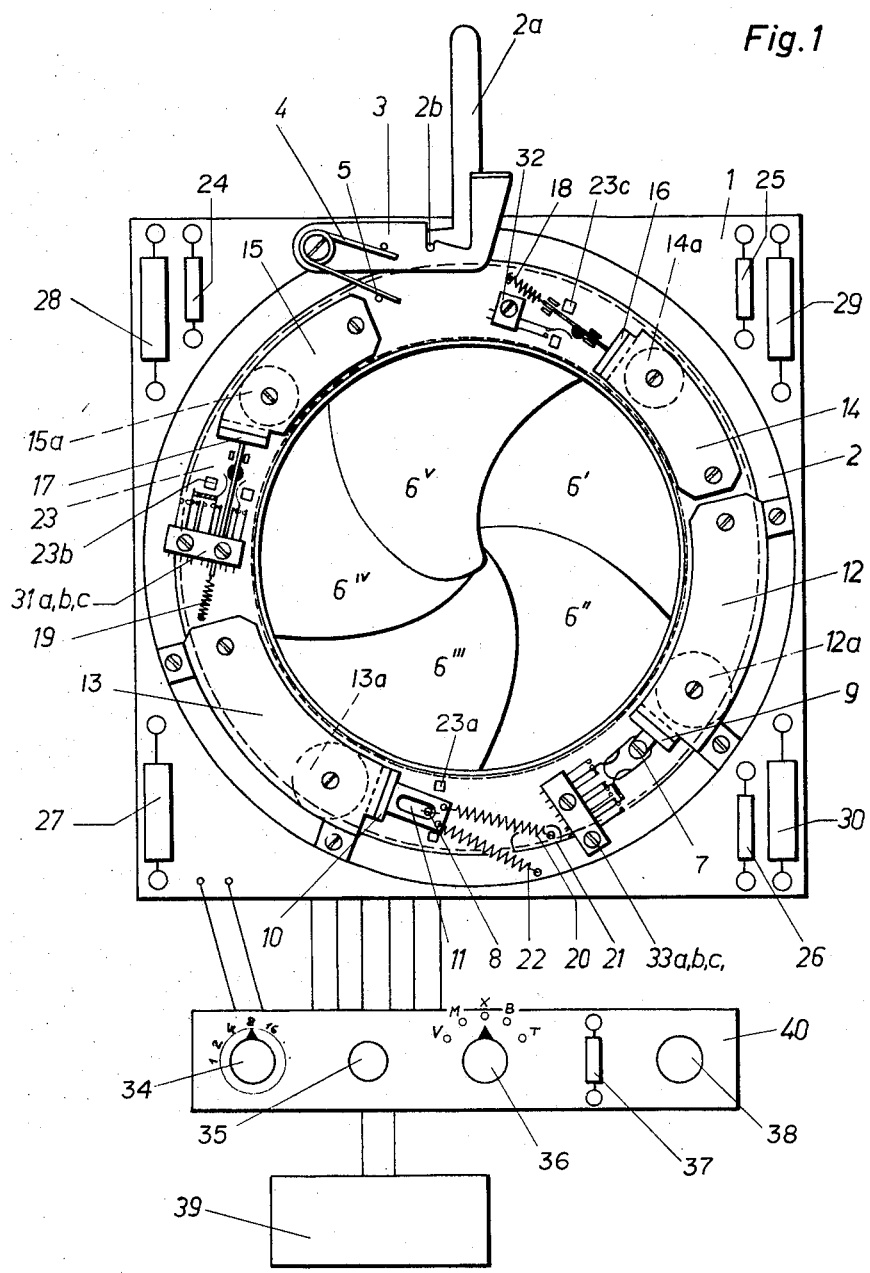
FIG. 1 is a front view of a photographic central shutter in the cocked condition.

Referring now, more specifically, to the drawing wherein like numerals indicate like parts throughout the several views there is shown in FIG. 1 the base plate 1 of a photographic central shutter. This base plate carries a shutter-opening ring 2, provided with an arm 2a for rotating the shutter opening ring about the optical axis of the camera. The opening ring 2 is retained by a catch 3 which is biassed in the counter-clockwise direction by a hairpin spring 4 engaged by a fixed pin 5.

Figure 4:
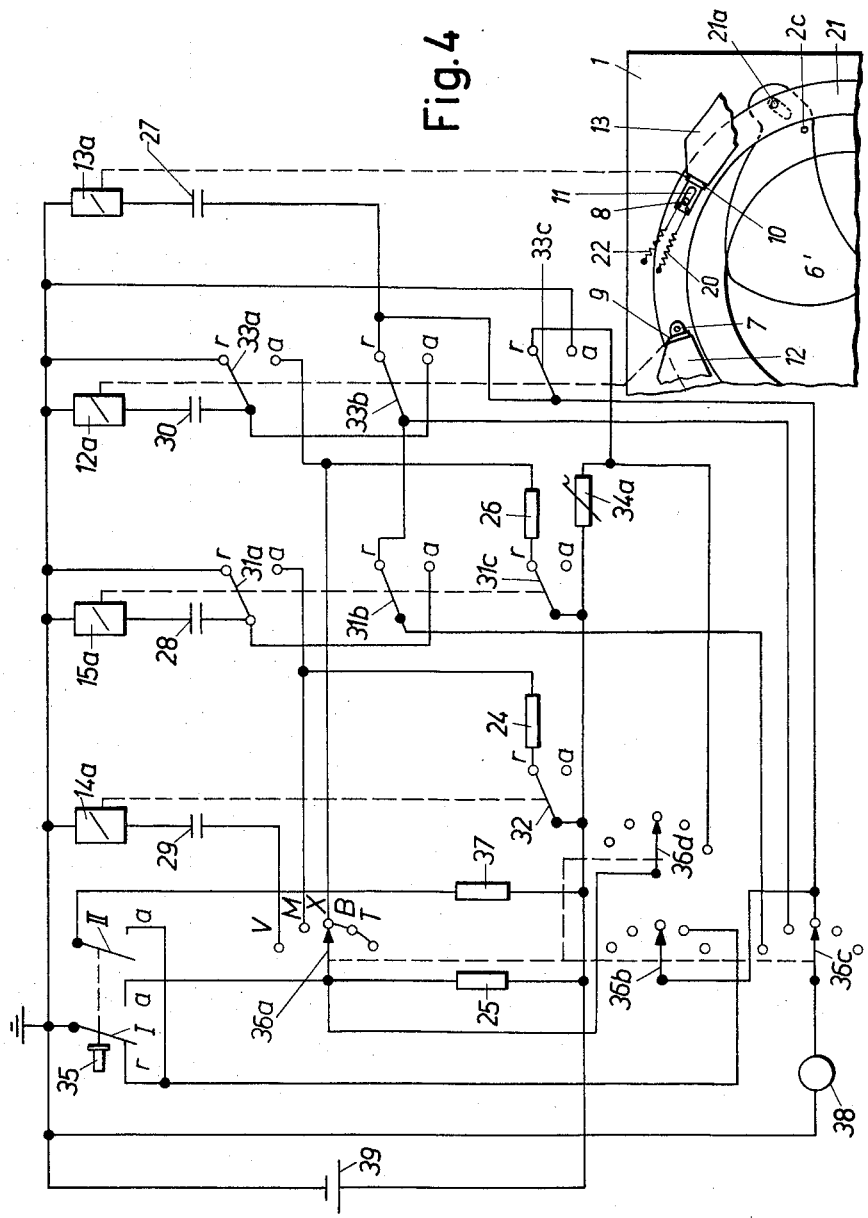
FIGURE 4 is a diagram of the electrical control arrangement.

Referring to FIG. 4 there can be seen mounting pins 2c for the sectors 6$^{I-V}$ of the shutter and these mounting pins are fixed on the base plate 1. Pins 21a are fastened to a blade ring 21, which can also be seen in FIGURE 4 and which is mounted concentrically in relation to the optical axis in the usual way. Pins 21a engage in slots in the shutter blades and it can be seen that rotation of the blade ring will actuate the shutter blades. The rotation of ring 21 in the clockwise direction causes pivoting of the blades 6$^{I-V}$ about their mounting pins 2c and the consequential opening of the shutter. In addition, the blade ring 21 has pins 7 and 8 which project upwardly through slots in the base plate 1, these pins 7, 8 co-operating with armatures 9 and 10. Armature 9 is, in fact, fastened to the pin 7, while the armature 10 has a slot 11 in which the pin 8 is capable of free movement during the shutter-opening movement of ring 21. Fixed to the ring 2 are permanent magnet systems 12 (for armature 9) and 13 (for armature 10). They are provided with coils 12a and 13a respectively, so devised that when they are energised, they each set up a magnetic field opposing that of the permanent magnet system concerned, thereby cancelling the holding power of the system. Attached to the armature 10 is a tension spring 20 which is anchored at its other end to the blade ring 21, so urging the blade ring in the clockwise direction. A further tension spring 22 is connected to the armature 10 and is attached at its other end to the opening ring 2.

In addition, the shutter includes stationary permanent magnet systems 14 and 15 which, like the systems 12 and 13, are provided with coils, here 14a and 15a. The permanent magnet systems 14 and 15 have armatures 16 and 17 respectively under the bias of tension springs 18 and 19, respectively. A cocking ring 23, shown in FIGURE 1 in dotted lines and rotatable about the optical axis, is provided with forked cocking dogs 23a, 23b and 23c. These cocking dogs are arranged so that they engage the armatures 10, 17 and 16, in response to rotation of ring 23 in the clockwise direction, and apply them against the permanent magnets respectively associated therewith. The cocking ring 23 is urged by a return spring (not shown) in the counter-clockwise direction, so that the cocking dogs are restored to the position seen in FIGURE 1 after the assembly has been cocked. The cocking ring 23 is operated by means which are known for this purpose and have therefore not been illustrated. This means may comprise, for example, a lever or a spindle.

The base plate 1 of the shutter further carries resistances 24, 25 and 26 and condensers 27, 28, 29 and 30 and sets of stationary contact springs 31a, 31b, 31c and 32 are provided for operation by the armature 17 and 16 respectively. When armatures 17 and 16 are de-energised, contact springs 31a, 31b and 31c, and the contact spring 32, respectively, are brought into the switch position r (see FIGURE 4). Fastened to the opening ring 2 is a further contact spring set 33a, 33b and 33c which is operable by the pin 7 connected to the armature 9. These contact springs are also brought into the switch position r when the armature is de-energised.

A control panel 40, separate from the shutter, is illustrated in FIGURE 1. Provided on this control panel are a rotary knob 34, by means of which the period of exposure can be set on an adjustable rheostat 34a (see FIGURE 4), a trip button 35, a four-armed programming switch 36, an electrical resistance 37, and a four-layer diode 38. A battery 39 is connected through electrical leads to the electrical assembly which is arranged on the control panel 40. The devices on this panel 40 may be attached to the body of the camera. The battery 39 may also, in known manner, be disposed within the body of the camera.

The diagram in FIGURE 4 shows the coils 12a, 13a, 14a and 15a of the permanent magnet systems 12, 13, 14 and 15. The mechanical connection between the armatures 9, 16 and 17 and the contact spring sets 33a, 33b, 33c, and 32, and 31a, 31b, 31c, respectively, is indicated in FIGURE 4 by broken lines. The mechanical coupling of the four arms of the programming switch 36, mentioned above and described in more detail below, with those of contact spring sets I and II of the trip button 35, which also is described in more detail below, is also illustrated by broken lines. The full lines in this diagram represent electrical connections.

The coils 12a, 13a, 14a and 15a of the permanent magnets cooperate with the storage condensers 30, 27, 28 and 29. In the rest position, i.e. with the shutter run down, the contact springs, already referred to and operated by the magnetic armatures, are disposed in position r, and they move to position a when the shutter is cocked. Moreover, FIGURE 4 shows five resistances 24, 25, 26, 34a and 37 which cooperate wtih the storage condensers 27, 28, 29 and 30 in a manner described in more detail below. In addition, FIGURE 4 depicts the aforementioned programming switch 36 with its four switch arms each of which can assume each one of five switch positions for the purpose of selecting programmes V, M, X, B and T. These programmes are chosen as follows:

*Programme V.*—Release of the shutter 8 to 10 seconds after operation of the trip button 35.

*Programme M.*—Closure of the circuit of a flashlight on operation of the trip button 35, and release of the shutter approximately 16 milliseconds after operation of the button.

*Programme X.*—Release of the shutter on operation of the trip button 35. On full opening of the shutter, this itself closes the flashlight circuit.

*Programme B.*—Release of the shutter on operation of the trip button 35, the shutter being open whilst pressure is still applied to the button, and closure of the shutter on release of the button.

*Programme T.*—Release of the shutter on operation of the button 35, automatic latching of the shutter in the open position, and closure of the shutter by renewed operation of the button.

The four switch arms of the programming switch 36 are designated 36a, 36b, 36c and 36d. The trip button 35 is used to fire the aforementioned electrical assembly and thus initiate the operation of the shutter. It comprises contact spring sets I and II, of which only the working contact a of the contact spring I is used in pursuance of nearly all programmes. The rest contact r of the contact spring I and the working contact a of the contact spring II are only effective during programme B. Finally FIGURE 4 shows the four layer diode referred to above, and this can be applied to three different electrical connections by the switch arm 36c.

Figure 2:
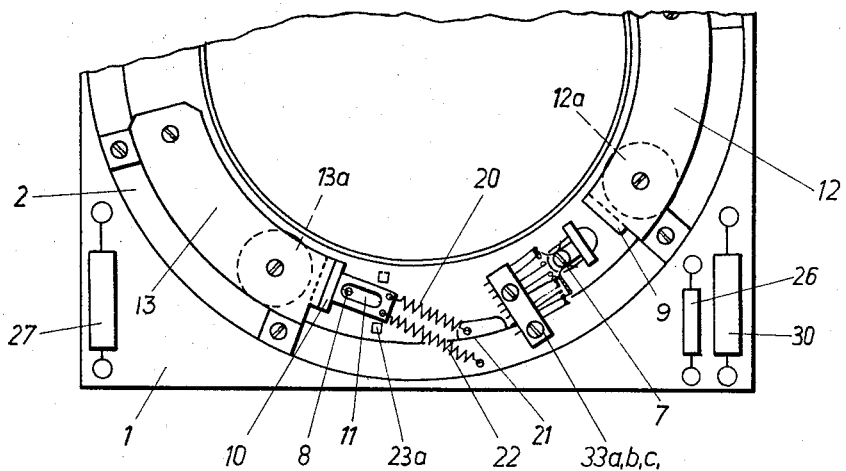
FIGURE 2 shows the shutter of FIGURE 1, partly broken away and in the open condition.
Figure 3:
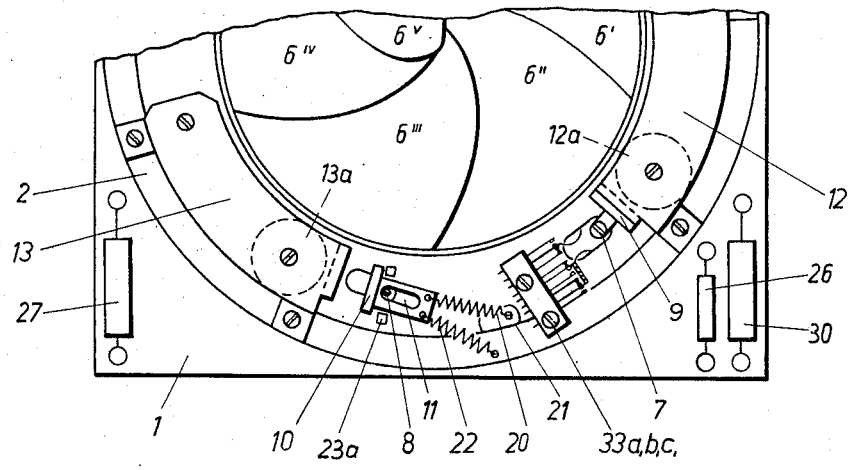
FIGURE 3 is a partial view of the shutter of FIGURE 1 in the released condition.

Before describing the operation of the electrical shutter-control arrangement illustrated in FIGURE 4, it will be advantageous first to refer to the function of the mechanical and electromechanical parts illustrated in FIGURES 1 to 3. Finger pressure on the trip button 35, with the programming switch 36 set to X, results in the following procedure:

The armature 9 is de-energised, whereupon the tension spring 20 turns the blade ring 21 (see also FIGURE 4) in the clockwise direction. As a consequence the blades 6$^{I-V}$ are pivoted in the clockwise direction out of the light path. The pin 7 abuts the contact springs 33a, 33b and 33c and throws them over. During the shutter-opening movement of the pin 8, blade ring 21 has moved freely along the slot 11 of armature 10 (see FIGURES 1 and 2). After the expiration of the period pre-set by knob 34, the adjustment of which is described in more detail below, the armature 10 collapses. As a result the tension spring 22 moves armature 10 to the right, as seen in FIGURE 1. The armature 10 carries with it the pin 8 of the blade ring 21 located in the slot 11, whereby the blade ring and thus the blades are restored to the rest position of FIGURE 3. During its return rotation into the rest position blade ring 21 carries the armature 9, secured to pin 7, back against magnet 12. FIGURE 3 shows that the armature 10 is de-energised when the shutter is released, whereas armature 9 bears against magnet 12 as in FIGURE 1.

The magnet systems 14, 15 are not required for programmes X, B and T. In programme B the mechanical parts move as in programme X but the period of opening of the shutter is controlled directly by pressure on the trip button 35. In programme T the shutter is opened in response to a first initial operation of the button, as in the case of programmes X and B. The shutter, however, remains latched in the open position, making a repeated operation of the trip button 35 necessary to initiate the closure movement. In programme M the holding power of the magnet system 15 is first overcome, so that the armature 17 is de-energised, thereby to operate the contact springs 31a, 31b and 31c. Then, after elapse of the pre-set delay period of 16 milliseconds, the holding force of the magnet system 12 is weakened until the armature 9 is de-energised, and the function described above for programme X initiated. Finally, for programme V, a delay is imposed on the release of the shutter by means of a further magnet system 14, as is known in connection with mechanical time delay systems. Immediately the trip button 35 has been operated, the armature 16 is de-energised and operates the contact spring 32 so that the armature 17 of the magnet system 15 collapses after about 10 seconds. The further course of programme V corresponds first of all to that of programme M, and then to that of programme X. It is to be noted that the magnet system 14 can be dispensed with if provision is made for switch adjustment of the time constant of system 15. An arrangement of this nature is intended to be included within the scope of the present invention.

To provide for opening of the shutter for the purpose of inspecting the focussing screen image, use is made of a mechanical opening device which is independent of the electrical means controlling the operation of the shutter:

The pin 2b of the opening ring 2 is released by finger pressure on the catch 3, so that this ring can be moved in the clockwise direction by means of the arm 2a. In so moving, the magnetic system 12 fastened to the aperture ring 2 carries along with it armature 9 bearing against it, whereby pin 7 moves blade ring 2 and thereby pivots the shutter blades outwards. In the course of this motion the pin 8 of ring 21 retains its position relatively to the slot 11 of the armature 10. During this procedure, moreover, the contact springs 33a, 33b and 33c, are not actuated because they, like the magnet system 12, are also on the opening ring 2. When this ring 2 has been retracted to the rest position illustrated in FIGURE 1, catch 3 snaps in again. The manual opening of the shutter, just described, can be carried out irrespective of whether the shutter is cocked or uncocked.

The operation of the arrangement ilustrated in FIGURE 4 will now be explained starting with the shutter parts in the position shown in FIGURE 1. It is to be noted that the armatures 9, 10, 17 and 16 are applied against the corresponding permanent magnets 12, 13, 15 and 14 and that the tension springs 20, 22 are loaded. Further the variable resistance 34a is so adjusted by appropriate setting of the rotary knob 34, that an exposure for a period of ⅛ of a second will ensue. Finally the programming switch 36 is set at X bringing the switch arms 36a, 36b, 36c and 36d into the positions illustrated in FIGURE 4. In contrast to the illustration in FIGURE 4 the contact springs 31a–c, 32 and 33a–c are disposed in the operating position designated a as a result of which the condenser 30 has been charged by the battery 39 through resistance 25.

When pressure is applied to the trip button 35, the contact spring I is applied against the working contact a, so that condenser 30 discharges through the coil 12a of magnet 12. The current flowing through the coil 12a sets up a field opposed to that of the magnet 12, as a result of which the armature 9 is released and spring 20 turns the blade ring 21 in the clockwise direction. This rotation pivots blades $6^{I-V}$ out of the light path (see FIGURE 2). As soon as the blades have fully cleared the light aperture, the shutter itself makes the circuit of an electronic flash appliance in known fashion, and therefore not here described, and at the same time pin 7 of the blade ring 21 strikes the contact springs 33a, b and c and places them in position r. By this means condenser 27 is coupled to the battery 39 through the contact spring 33c and is charged to an extent dependent on the adjustment of the resistance 34a by knob 34. The period of charge which is required to bring the four-layer diode 38 to critical voltage corresponds to the exposure time of ⅛ second set by the rotary knob 34. When the critical voltage of the four-layer diode is reached, the condenser 27 discharges. The current which as a consequence flows through coil 13a sets up a field opposing that of permanent magnet 13, and as a result the armature 10 is released so that the tension spring 22 can move blade ring 21 back to the shutter-closed position (see FIGURE 3, which shows the armature 9 as having been brought back to the permanent magnet 12 by the closure operation). During the closure movement the pin 7 has released the contact springs 33a, b and c so that these are again located in the operating position a. The electrical coupling of the condenser 27 to the battery 39 is interrupted by the return of contact spring 33c to the operating position. After the shutter has been re-cocked (by a means to be described more fully hereinafter), which in the present case means the reapplication of the armature 10 against the permanent magnet 13 and thus the loading of the tension springs 20–22, the trip operation can be repeated. As indicated above, adjustment of the required exposure periods is performed by regulating the resistance 34a by means of the rotary knob 34.

When the programming switch 36 is in the position M, condenser 28 is charged through the contact spring 31a when the shutter is cocked. The four-layer diode 38 is connected to the condenser 30 through the agency of the switch arm 36c and the contact spring 33b. When the trip button 35 is pressed, the contact spring I is applied against the work contact a, whereby condenser 28 discharges through coil 15a. The resistance 26, and thus the condenser 30, are then connected to the battery 39 through the agency of consequently de-energised armature 17. During the delay period of 16 milliseconds, determined by the magnitude of resistance 26 and the capacity of condenser 30, condenser 30 is charged sufficiently for the critical voltage of the four-layer diode 38 to be achieved. The discharge of condenser 30, which now takes place through the four-layer diode, de-energises the armature 9 of magnet 12. The four-layer diode is then coupled by contact spring 33b to condenser 27 which is at the same time connected to battery 39 by means of the contact spring 33c through the variable resistance 34a. The further procedure, in which the charging time of the condenser 27 is again measured in accordance with the preset value of resistance 34a, follows the process already described for programme X. In the programme M which has been described above, the four-layer diode 38 is consequently used twice in succession, the first time to control the time delay for the flashlight, and the second time for controlling the exposure period.

In the switch position V of the programming switch 36, the condenser 29 is charged through resistance 25 when the shutter is cocked. The four-layer diode 38 is electrically coupled to condenser 28 through the switch arm 36c and contact spring 31b. When the trip button 35 is now operated, contact spring I is applied against the working contact a and the discharge circuit of condenser 29 consequently closed. As a result armature 16 is de-energised and moves the contact spring 32 into its rest position r, so that the condenser 28 is connected to the battery voltage supply through resistance 24 and contact spring 31a and becomes charged. The time constant of the RC member consisting of the resistance 24 and condenser 28, is so selected as to achieve the required delay of 8–10 seconds between the operation of the trip button 35 and the later collapse of the armature 9 and consequent release of the shutter. When armature 17 is de-energised, as a consequence of a balance being reached between the charged voltage of condenser 28 and the critical voltage of the four-layer diode 38, the latter is connected to condenser 30 through the agency of contact spring 31b. At the same time condenser 30 is coupled to the battery through the resistance 26 by means of the contact spring 31c in the manner previously described for programme M. The steps of programme M previously described are then followed and the description of these need not therefore be repeated.

From the foregoing it will be understood that, in switch position V of the programming switch 36, the four-layer diode 38 is used on three successive occasions to terminate the condenser charging operations, inasmuch as it first controls the length of the so-called start delay and then the length of the pre-flash period, and finally assumes control of the exposure period.

When the programming switch 36 is in position B, the four-layer diode 38 is cut out and made ineffective by the switch arm 36c. The condenser 30 is coupled to the battery 39 through the switch arm 36a and resistance 25 and is charged. The condenser 30 is discharged through coil 12a when the trip button 35 is pressed so that the collapsed armature 9 releases blade ring 21 for rotation in the clockwise direction and as a result the shutter is opened. At the same time the condenser 27 is rapidly charged through the resistance 37, the contact spring II of the trip button 35 which is applied against the working contact a, and the switch arm 36b. When the trip button 35 is released, condenser 27 discharges through the coil 13a, the rest contact r of the release contact spring I, and switch arm 36b. The armature 10 consequently collapses and the tension spring 22 pulls the blade ring 21 back to its starting position, so reclosing the shutter.

The four-layer diode 38 is also cut out by the switch arm 36c in position I of the programming switch 36. When the shutter is cocked the condenser 30 is charged through resistance 25. When pressure is applied to the trip button 35 the condenser 30 is first discharged, as in the case of programmes X and B, and the armature 9 therefore released, so that the tension spring 20 opens the shutter. Upon collapse of armature 9, condenser 27 is connected to earth through the contact spring 33c (in the rest position r), the switch arm 36d and the release contact spring I which is pressed against its working contact a, and as a result it cannot charge through resistance 25. This resistance 25 is merely a load for the battery 39 which is effective when pressure is applied to the trip button 35. When this button 35 is released, condenser 27 is charged through resistance 25 and the switch arm 36d. When pressure is applied again to the trip button 35, condenser 27 discharges through the coil 13a to cause the armature to collapse, whereby the tension spring 22 is allowed to operate and to close the shutter.

Figure 5:
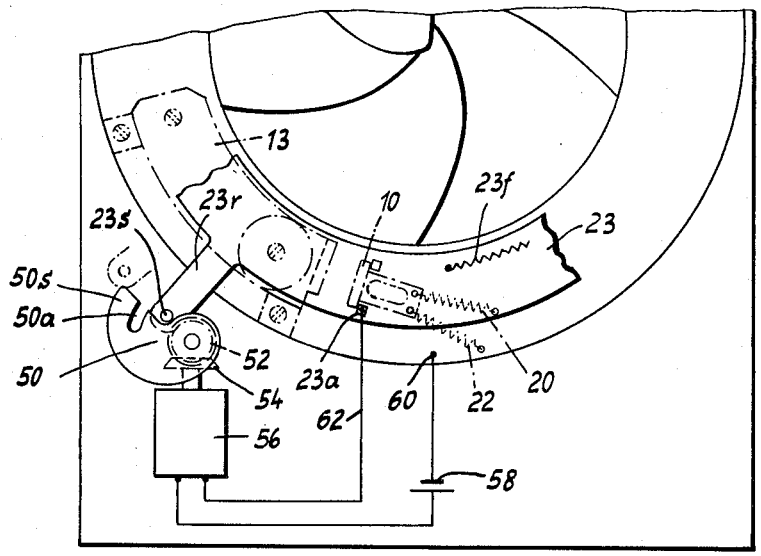
FIGURE 5 is a partial front view showing a modification providing an automatic shutter cocking means.

In FIG. 5 there is disclosed a means for automatically cocking the shutter. There is provided an electric motor which will be automatically switched off and on, this electric motor driving the cocking ring to its cocked position.

The cocking ring 23 is provided with cocking dogs 23a, 23b and 23c and in the embodiment shown in FIGS. 1 to 4 the cocking ring must be moved by hand to the cocked position. In the FIG. 5 embodiment the cocking ring 23 is provided with a radial arm 23r having a pin 23s on the outer end thereof. The pin 23s is maintained in engagement with a driving cam 50 by means of spring 23f. The driving cam is coupled with an electric motor 56 by means of bevel gears 52 and 54. One pole of the motor is connected with a battery 58 and the battery is connected at 60 with the ring 2. The other pole of the motor is connected with the cocking dog 23a by means of wire 62. Suitable insulation may be provided for insulating the parts 23 and 23a from the remaining elements.

When the armature 10 is released from the permanent magnet 13 and reaches the position shown in FIG. 5 (the rest position of the shutter), the circuit of the electric motor 56 will be closed through the circuit 62, dog 23a, armature 10, spring 22 and contact 60. When the electric motor is energised, the driving cam 50 will be driven counterclockwise. Thus, the cocking ring 23 is rotated clockwise and the armature 10 is brought into engagement with the permanent magnet 13. When the armature 10 moves into engagement with the permanent magnet the arm 23r and pin 23s will be in the dotted line position of FIG. 5 with respect to the cam 50 and the spring 23f will return the ring 23 to its rest position. The electric motor will stop since at the beginning of the return movement of the ring 23 the circuit of the motor is interrupted between points 10 and 23a.

The driving cam 50 may be made of an elastic material such as plastic and has a slit 50a so that the peripheral portion of the cam is resilient.

The transfer of the armatures 16 and 17 from their released position to their held position may also be achieved by rotating the cocking ring 23 in a similar manner by means of motor 56.

Obviously many modifications and variations of the present invention are possible in light of the above teachings. What is claimed as new and is desired to be secured by Letters Patent is:

1. Shutter operating means for a camera comprising, a shutter, a rotatable blade ring for opening and closing the shutter, a control member for selecting one of a plurality of shutter opening and closing programmes, means comprising a variable resistor for selecting the exposure time of the shutter, means operatively connected with said control member for actuating the blade ring to open and close the shutter according to the preselected programme, said last-named means including a plurality of armatures and magnetic means retaining said armatures in a first engaged position, spring means urging said armatures to a second disengaged position, and means for automatically cocking the shutter, said means comprising a cocking ring having a plurality of cocking dogs thereon engageable with the armatures and electric motor means for rotating the cocking ring and driving said armatures from the second disengaged position to the first engaged position with respect to the magnetic means associated therewith, said motor means being energized by one of said armatures moving to the disengaged position with respect to the magnetic means associated therewith.

2. Shutter operating means according to claim 1 wherein said electric motor is energised when one of said armatures engages a cocking dog, said electric motor driving a cam engageable with a projection on the cocking ring.

3. Shutter operating means according to claim 2 wherein said cam is flexible and has a recess adjacent the periphery thereof.

4. In a camera of the class described comprising, a shutter, a rotatable blade ring for opening and closing the shutter, a first armature connected to said blade ring, a first fixed magnet engaging said first armature to retain the shutter closed, a second fixed magnet, a second armature engaging said second fixed magnet, a first spring extending between the blade ring and said second armature urging the blade ring in a shutter opening direction, a first coil for nullifying the magnetic effect of said first magnet, first circuit means for energising said first coil, said circuit means including a first condenser and a trip switch, a second coil for nullifying the magnetic effect of said second magnet, second circuit means for energising said second coil, said second circuit means including a second condenser and switch means for closing the charging circuit to said second condenser, said switch means closed by release of the first armature, second spring means extending between said second armature and a part stationary with respect to the blade ring for rotating the blade ring to close the shutter, and a variable resistor in the charging circuit for said second coil for varying the exposure time.

5. In a camera according to claim 4 and further including means connected with the trip switch for preventing the charging of said second condenser while the switch is maintained closed.

6. In a camera according to claim 4 and further including RC circuits connected to the charging circuit for said first condenser whereby a predetermined time delay may be effected between actuation of said trip switch and opening of the shutter.

7. A system for operating the shutter of a camera comprising a rotatable blade ring for opening and closing a shutter, a first armature connected to said blade ring, first magnetic means normally engaging said first armature to retain the shutter closed, first spring means urging said blade ring to rotate in a direction to open the shutter, a first electrical circuit means connected with said first magnetic means for varying the magnetic field thereof and releasing said first armature whereby the first spring means rotates the blade ring to open the shutter, a second armature, second magnetic means normally engaging said second armature, means interconnecting said second armature with said blade ring, second spring means urging said second armature to rotate the blade ring to close the shutter and a second electrical circuit means connected with said second magnetic means for varying the magnetic field thereof and releasing the second armature whereby the second spring means rotates the blade ring to close the shutter, means for cocking the shutter when the shutter has run down, said cocking means including an electric motor for driving said second armature into engagement with said second magnetic means and thereby energising said first and second spring means, and circuit means for actuating said electric motor, said circuit means being energised by said second armature moving to a disengaged position with respect to said second magnetic means.

8. An electrical system for controlling the operation of a photographic shutter, said system comprising a plurality of RC-circuits for controlling a variable time delay between the operation of the shutter trip means and the start of the shutter run-down movement necessary for a plurality of predetermined exposure modes, e.g. a self-timer exposure with a relatively long time delay, a flashlight exposure with a relatively short time deay, or a B- or T-exposure with substantially no time delay, respectively, a single electrical control element having a predetermined breakdown voltage operatively connected in said electrical system, a manually movable setting means connected in said system for selecting one of said predetermined exposure modes, and switching means in said system for connecting said RC-circuits sequentially with said single electrical control element in predetermined positions of said manually movable setting means.

References Cited by the Examiner

UNITED STATES PATENTS

| | | | |
|---|---|---|---|
| 2,577,774 | 12/1951 | Lee | 95—53 |
| 2,969,722 | 1/1961 | Schwartz | 95—31 |
| 2,999,445 | 9/1961 | Fahlenberg | 95—63 |
| 3,020,816 | 11/1962 | Frenk | 95—53 X |
| 3,063,354 | 11/1962 | Matulik | 95—53 X |

JOHN M. HORAN, *Primary Examiner.*

NORTON ANSHER, *Examiner.*